March 20, 1934.  A. McL. NICOLSON  1,951,523
ELECTROOPTIC CONTROL SYSTEM
Filed July 24, 1930  3 Sheets-Sheet 1
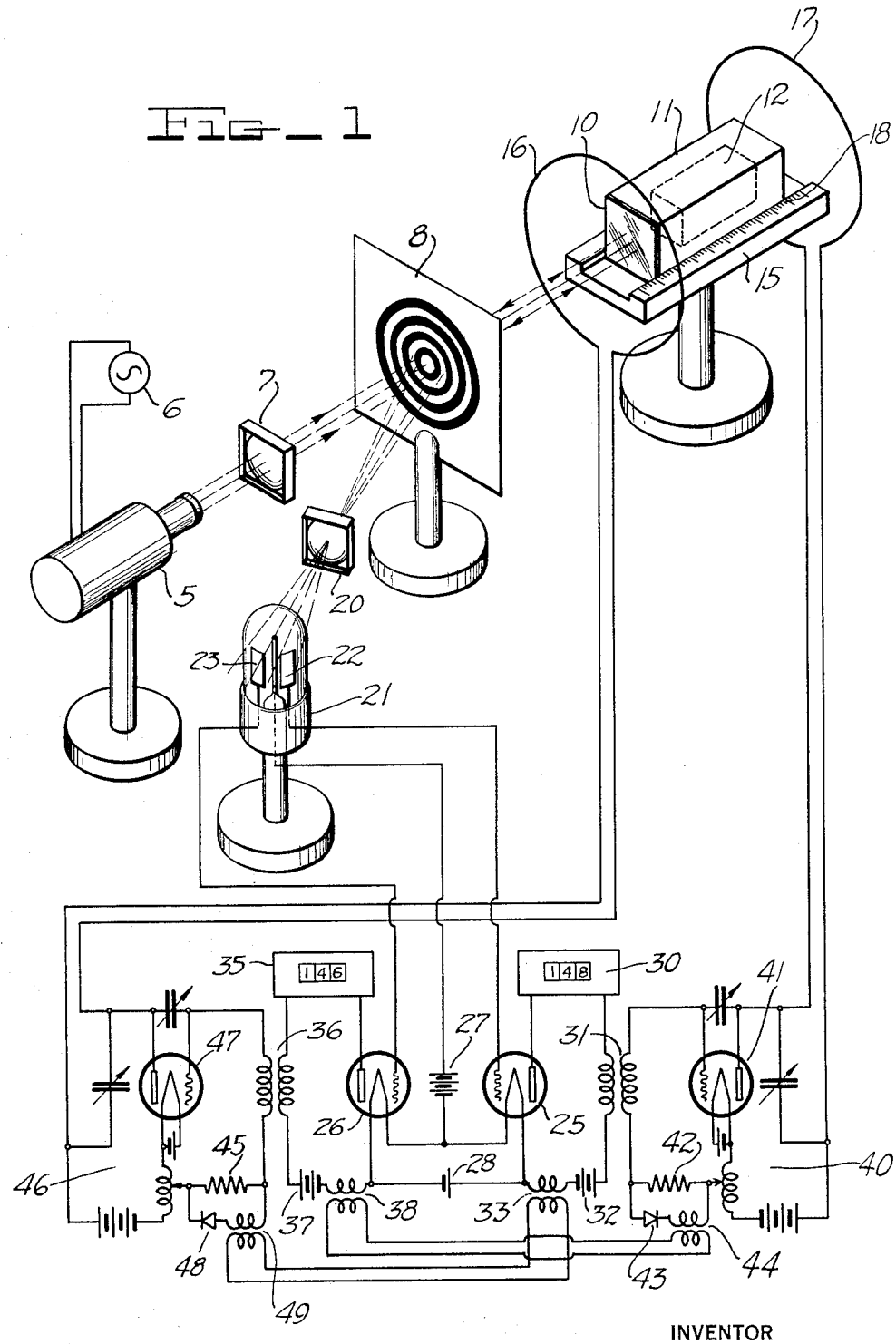
INVENTOR
Alexander McLean Nicolson
BY
ATTORNEY

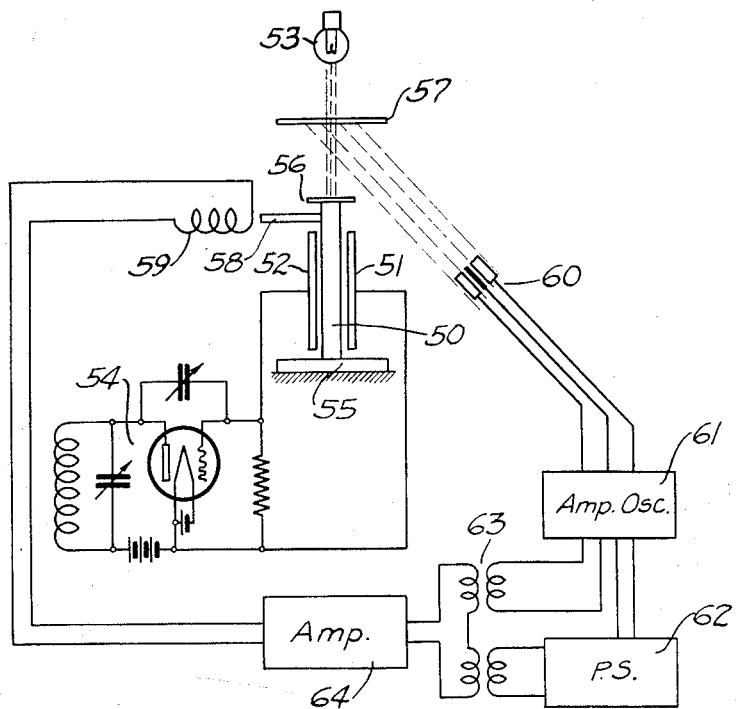
Fig_2
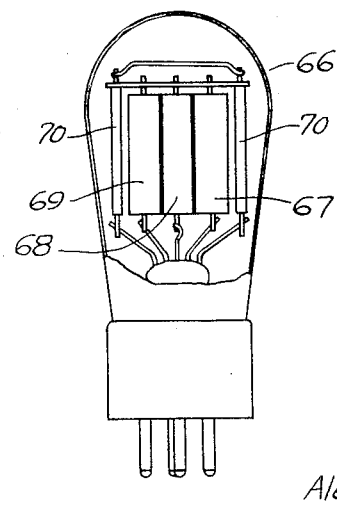
Fig_3
INVENTOR
Alexander McLean Nicolson.
BY
ATTORNEY

March 20, 1934. A. McL. NICOLSON 1,951,523
ELECTROOPTIC CONTROL SYSTEM
Filed July 24, 1930 3 Sheets-Sheet 3
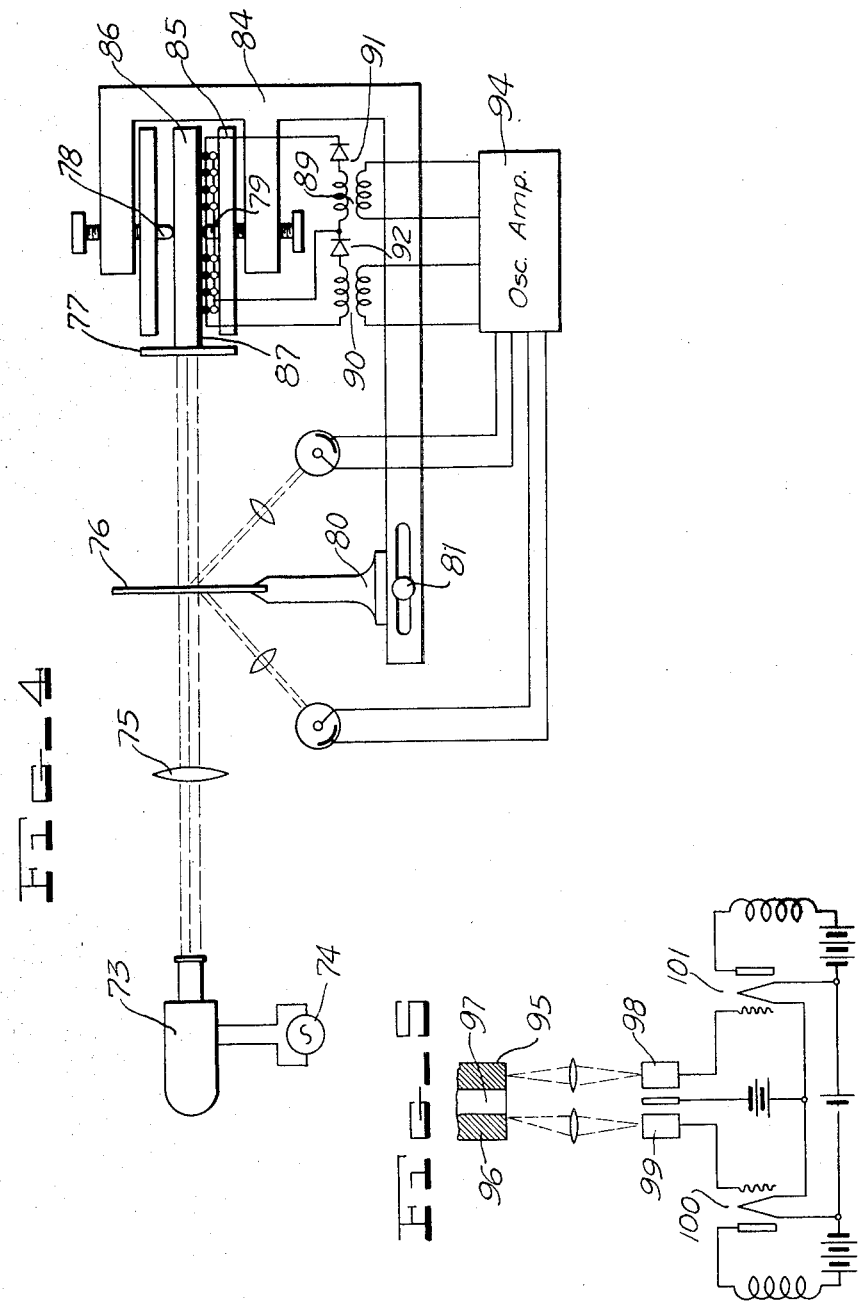
INVENTOR
Alexander McLean Nicolson
BY
ATTORNEY Patented Mar. 20, 1934

1,951,523

UNITED STATES PATENT OFFICE 1,951,523

ELECTROOPTIC CONTROL SYSTEM

Alexander McLean Nicolson, New York, N. Y., assignor to Communication Patents, Inc., New York, N. Y., a corporation of Delaware Application July 24, 1930, Serial No. 470,326

14 Claims. (Cl. 250—36)

This invention relates to systems for the control of constants, and particularly to systems for the control of constants such as dimensions, frequencies and temperatures.

An object of this invention is to provide a system for measuring variations in dimensions, frequencies and temperatures from a desirable constant value to an extremely fine degree.

Another object of the invention is to maintain the frequency of an oscillating element or the temperature of such an element constant.

A further object of the invention is to obtain extremely fine measurements or the control of constants within narrow limits by means of light interference rays produced by the adding and subtracting of light.

It is well known in the art that light is propagated by wave motion, such that when two light rays are projected on an object 180° out of phase, no light will result, while the addition of the two rays in phase will increase the amount of illumination. In other words, when light is projected on a partially silvered medium which is semi-opaque and semi-transparent and the emergent waves reflected again onto said medium, alternate dark and light areas in the form of rings are produced on the medium when properly positioned. These are known as Newton's rings, and the dark areas are caused by the oppositely traveling rays 180° out of phase neutralizing each other. With monochromatic light, these rings are alternately light and dark areas, while with white light the areas are colored.

This invention contemplates a system, in which the reflecting medium is a portion of, or a portion controlled by the medium which is to be maintained constant. For instance, the control may be of a piezo electric crystal in an oscillating system, which through change of temperature, varies its frequency of oscillation. The crystal has a reflecting surface thereon or on its casing which, when displaced by expansion of the crystal through temperature changes, causes a movement of the interfering light pattern. This movement is detected by a photoelectric cell system, which actuates factors reverting the crystal to normal. This invention also contemplates the measurement of the contraction or expansion of materials with temperature to within a wave length of a monochromatic light ray, the value of which is known.

Regulation or automatic adjustment is accomplished by the light rays actuating photoelectric cells arranged to intercept projections of the changing light patterns. The cells operate oscillators which may produce magnetic fields of opposite polarities or heating and cooling currents to obtain temperature control. The heating and cooling or Peltier effect is obtained by passing current through a junction of antimony and bismuth, for instance, in opposite directions. Since an almost imperceptible change in length will be detected, an extremely constant temperature may be maintained.

The details of the invention will be more fully understood from the following description with reference to the accompanying drawings, in which:

Figure 1 is a diagrammatic drawing of a system showing the automatic control of a reflecting surface.

Fig. 2 shows the adaptation of an interference light system to the magnetic control of a piezo electric crystal.

Fig. 3 is a view of a photoelectric cell having three independent cathodes, which may be used in the systems of Figs. 1 and 2.

Fig. 4 shows the adaptation of an interference light system to the temperature control of a piezo electric crystal; and Fig. 5 is a diagrammatic representation of the arrangement of a double cathode photoelectric cell with its associate lens system.

Referring specifically to Fig. 1, a system employing the use of interfering light bands is adapted to the measurement of the expansion and contraction of materials during temperature changes or by other means which cause expansion and contraction. By a slight modification, the deformation under torsion, or compression and the elongation under tension of a test specimen may be measured with great accuracy. A source of monochromatic light 5 which may be a mercury arc light producing a green ray, is shown supplied from a source of alternating current 6. This energy source may, of course, be direct current, and from any type of supply. Light from the lamp 5 is projected through a lens 7 and a semi-opaque semi-transparent medium 8, which may be a partially silvered semi-opaque mirror. The emergent waves are projected on a reflecting surface 10 of an element 11, the reflected waves being projected back on the medium 8. At a definite position of the medium 8 with respect to the reflecting surface 10, the rays of light will form alternate light and dark areas caused by the neutralizing of the waves which are 180° out of phase. To cause this formation, the surface 10 is very slightly curved to form rings, or out of parallel with the plane of medium 8 to form lines.

The element 11 is shown as a non-metallic body having an internal body 12, the body 12 being unnecessary when the element 11 is of magnetic material itself. The element being measured is shown mounted on a grooved stand 15, on which it is free to expand or contract in a longitudinal direction or in a direction parallel to the light beams. The groove on which the element lies is of material having a small coefficient of friction, so that very little energy is required for its adjustment. Surrounding each end of the stand 15, and between which lies the element 11, is shown solenoidal coils diagrammatically represented by the two turns 16 and 17, the purpose of which will be explained hereinafter.

The area of the ring or line formation is focused by a lens 20 upon a double cathode photoelectric cell 21. The light is so projected on the cell that in a normal position no light will fall on either cathode, the dark portions shading the two cathodes from any light. Any movement, however, of the rings by expansion or contraction thereof through a movement of the surface 10 will bring a light portion of the area on either one of the cathodes. For instance, if a certain direction of movement projects light upon cathode 22, the focus system is so adjusted that the cathode 23 will remain without light for an appreciable period after cathode 22 has been lighted. This is accomplished by magnifying the dark areas to a size wider than the cathode elements. Magnification of the movement of the reflecting element is also accomplished by the optical arrangement to provide sufficient rapidity of movement of the light to produce an impulse. The electrodes of the cell 21 are connected to a compound vacuum tube circuit arrangement.

This vacuum tube system includes vacuum tubes 25 and 26, the grids of which are connected to the cathodes 22 and 23, respectively. Energy is supplied to the photoelectric cell from a battery 27, while the filaments of the vacuum tubes are supplied from the battery source 28. Vacuum tube 25 has included in its output circuit an impulse counter 30, the primary of output transformer 31, anode battery 32 and the primary of a control transformer 33. Similarly, the vacuum tube 26 has in its output circuit an impulse counter 35, the primary of an output transformer 36, anode battery 37, and the primary of a control transformer 38. Energization of the vacuum tube 25 starts and stops an oscillating system 40 having a vacuum tube 41 and the usual tuning condensers and electrode batteries. This oscillator has as an output and for its plate inductance, the coil 17 surrounding one end of the table 15. In the grid circuit of oscillator 40 is included a biasing resistance 42 shunted by a one-way rectifier 43 and the secondary of a biasing transformer 44. Oscillations received over transformer 44 are rectified in a direction to bias the tube 41 to a point where it ceases to operate and produces no oscillations in the coil 17.

Similarly associated with tube 26 is an oscillator 46 having a vacuum tube 47 and the usual tuning condensers; the plate inductance for this oscillator being the coil 16 at the other end of the table 15. In the input circuit of this oscillator is a biasing resistance 45 shunted by a rectifier 48 and a biasing transformer 49. Similar to the oscillator 40, the oscillator 46 may be made inoperative by energy received over transformer 49 and rectified by the rectifier 48.

The oscillation circuits are employed to revert the reflecting surface 10 to its normal position when it is forced to move by movement of the specimen 11. Movement of the surface 10 causes a shifting of the rings or lines across the medium 8. This movement is detected by the photoelectric cell 21. Assuming that the movement is such that cathode 22 is energized, the energization thereof will cause an impulse in tube 25. This impulse performs three functions. The impulse counter 30 will be operated and register the energization of the cathode 22; secondly, the impulse will be transferred through the control transformer 33 to transformer 49 and thereby bias the oscillator tube 47 to inoperativeness; thirdly, the impulse will be transmitted through transformer 31 and start the oscillator 40 in operation. This last operation will cause the energization of the coil 17 with a high frequency which will, in extremely small units of distance corresponding in occurrence to the frequency, move the element 11 toward the coil. This movement will restore the reflecting medium to normal, de-energizing cathode 22 and likewise the coil 17. Should the movement of the light rings continue to a point where cathode 23 of the photocell 21 be energized, energization of the coil 16 will not occur, since the oscillator 46 has been blocked. This will insure the operation of the oscillator 40 until it has accomplished the movement of the reflecting surface to its original position. If the coil 17 in adjusting the reflector overruns the normal position such that the light ring passes off of the cathode 22, but is on the cathode 23, then the bias on oscillator 46 is then removed and may be actuated to return the reflecting surface to its normal position This will very seldom occur, however, since the correcting action is practically instantaneous with the energization of either cathode of the cell 21. A coarse measurement may be obtained from a scale 18 on the block 15, but the accurate measurement of expansion or contraction is made by noting the number of energizations of either cathode from the impulse registers 30 and 35. The direction in which the reflector has been moved may also be determined from the respective numbers on the registers. With the above system extremely small movements caused by temperature changes or magnetic factors may not only be recognized, but accurately measured as to length and direction. This measurement is accurate to .5461 microns or $2.15 \times 10^{-5}$ inches the wave length of green light. That is each impulse will register 0.0000215 of an inch movement of the reflector 10. Different multipliers will be used, of course, for light of different wave lengths.

The adaptation of the interference light system to the control of an oscillating piezo electric crystal such as quartz or Rochelle salt, is illustrated in Figure 2. In this system a crystal 50 having electrodes 51 and 52 is connected into an oscillating circuit 54 of any well known type. The crystal 50 is shown mounted on a base 55 in a vertical position. On the upper edge of the crystal is a reflecting surface 56 which reflects the emergent waves from a semi-transparent medium 57 from a source 53, forming interference rings such as shown on the semi-transparent medium 8 in Fig. 1.

Also mounted on the upper portion of the crystal 50 is a polarized element 58 associated with a solenoidal coil 59. The element 58 is oscillated by the crystal 50 in the magnetic field formed by energization of the coil 59.

A double cathode photoelectric cell, shown diagrammatically at 60, detects any movement of the light and dark areas formed on the medium 57 through movement of the reflector 56 in a vertical direction, caused by expansion of the crystal 50. The amplifier oscillator system 61 is of the type shown in Fig. 1, but includes a phase shifter 62 which reverses the phase of the currents produced by one oscillator. The outputs of the oscillators are passed through a three winding transformer 63 and an amplifier 64 for energization of the coil 59.

The operation of this crystal control system is as follows: Assuming that the crystal has expanded and caused a light ray to be shifted to the left hand cathode of the cell 60. The energization of this cathode will cause an oscillating frequency in the upper portion of the transformer 63, which will be amplified and impressed upon the coil 59. As elongation of a crystal reduces its natural period of oscillation, the frequency of the field in which the element 58 is oscillated aids the crystal to oscillate sufficiently to bring its oscillation back to normal. In other words, the frequency of the current being impressed on the coil 59 is the same, as that generated by the oscillator 61, and is in synchronism with the crystal frequency oscillation. For expansion, therefore, the oscillating field aids the crystal in its mechanical oscillating movement. If contraction has occurred, energizing the right hand cathode of the tube 60, then the oscillating energy will be passed through the phase shifter 62 and appear at coil 59, in a sense to oppose the crystal in its oscillation, since its resonant period has been raised by contraction. The field generated by the coil 59 will tend to repel the magnetic member 58 at all times. The retarding and aiding fields may be obtained from the crystal oscillating circuit with the photocell operating a relay to control the impression thereof on the coil 59.

In Fig. 3, the construction of a photoelectric cell 66, having three independent cathodes 67, 68 and 69 is represented. This cell has a common anode 70 which partially encircles the three cathodes. Such a compound photoelectric cell may be employed as the element 31 or 60 in Figs. 1 and 2, for the purpose of detecting the movement and the direction of light from reflecting surfaces or of the light portions of an interference pattern. This cell may have a standard base construction with the terminal prongs of the standard radio tube.

Referring to Fig. 4, another crystal control system is represented. In this system a source of monochromatic light 73 energized from the electrical source 74 is projected through a lens 75 and partially through a semi-transparent medium 76 similar to 8 of Fig. 1. The emergent light waves are reflected back to the medium 76 from an interference ring forming reflecting surface 77. This surface is mounted on a crystal similar to that of the reflecting surface 56 in Fig. 2, but in this system the crystal is mounted upon central fulcrums 78 and 79. These fulcrums are adjustable and the crystal may be placed therein at the proper nodal point. The medium 76 is shown mounted on an adjustable stand 80 having an adjusting screw 81. The crystal is not shown with its oscillatory circuit, but such a circuit is well known in the art and may be of the type shown in Fig. 2.

In this system two photoelectric cells are employed, one of which is focussed on a dark ring, and the other of which is focussed upon a light ring or upon a second dark ring. Any movement of the rings will illuminate one or the other of the cells first, and produce the responsive action to be described. In this system the control of the crystal is accomplished through temperature, the crystal not only being heated, but being cooled by the use of electric currents. As shown in the drawings, the crystal is mounted upon an E shaped stand 84. Between a mounting plate 85 and the crystal 86 is a heat distributing layer 87. Between this layer and the plate 85 is a plurality of thermal couples composed of elements of bismuth and antimony or other elements, providing the effect desired. Current is fed to these elements through two transformers 89 and 90, with which is associated one way rectifiers 91 and 92, respectively. Energy arriving over transformer 89 will pass from one set of elements, for instance bismuth, to the antimony elements represented by the light circles, while energy over transformer 90 will pass from the antimony to the bismuth elements. Current passing from the bismuth to the antimony elements produces a cooling effect to the first power of current which, if maintained small, will succeed in decreasing the temperature of bodies immediately adjacent thereto. By connecting the elements in parallel or in a series parallel arrangement, large and rapid cooling or heating effects may be obtained with small currents through each couple before the $I^2R$ heating of connecting wires is apparent. Current passing from the antimony to the bismuth elements, however, will produce a rise in temperature in the materials immediately surrounding these elements. These two effects, of course, are known as the Peltier effect. In the operation of the present system, therefore, actuation of a certain one of the photoelectric cells will cool the crystal, while operation of the other cell will heat the crystal. Adjustment is made so that for any expansion or contraction within a wave length of light, temperature changes will be responded to immediately, to restore the crystal to its desired dimensions. The oscillator amplifier 94 may be of the type shown in the circuit of Fig. 1.

Referring to Fig. 5, the method of focussing the photoelectric cell with respect to the light and dark areas is represented. Assuming the rectangles 95 and 96 to be the dark areas, and the rectangle 97 to be the lighted portion, then the cathodes 98 and 99 of the diagrammatic representation of the cell may have no light focussed thereon by the position of the lenses and cell as shown. It will be noted that the cathode 99 is focussed at the edge of the dark band 96, so that any movement to the left by the rings will energize cathode 99, while cathode 98 still remains on a darkened portion. The cathode 99 may then operate the vacuum tube 100 to either control an element by magnetism or by temperature. Movement of the rings in the other direction will energize cathode 98 first, causing vacuum tube 101 to produce a contrary or reverse effect.

In the above disclosed light interference system, temperature or frequency control may be maintained to within a wave length of light, a wave length of light being equivalent to the width of the interference light rings, the magnification of which may be controlled by the curvature of the reflecting medium. The wider the rings, however, the more rapid will be their movement for a like distance of travel of the reflecting surface. By the use of a complete electrical control, substantially instantaneous normal reverting factors may be brought into play and a frequency or temperature maintained constant within extremely narrow limits.

In the case of the measuring system shown in Figure 1, it is unnecessary to employ the electrical adjusting oscillators, the specimen being fixed at one end and the counter readings taken. One counter will read expansion and the other contraction by wave lengths. Elongation and deformation may be measured to an accurate degree by placing a reflecting mirror on the movable end of the test specimen.

This invention is applicable to many requirements, and although it has been disclosed in several preferred embodiments, it is not to be limited except by the scope of the appended claims.

What is claimed is:

1. In combination, a source of light, a medium for partially transmitting said light, a photoelectric device, a reflecting surface, said surface reflecting said transmitted light to said medium, means for projecting the light of said medium on said photoelectric device and means energized by said device for controlling the distance of said reflecting surface from said transmitting medium, said means including an oscillating circuit.

2. In combination, a piezo electric crystal having a light reflecting surface thereon, a source of light, means for impressing a portion of the light from said source on said reflecting surface, a light transmitting medium for transmitting a portion of said light from said reflecting surface, a supply of heat for said crystal, and photoelectric cell means energized by light on said light transmitting medium for controlling the heat supplied to said crystal.

3. In combination, a piezo electric crystal, a heat source therefor, a photoelectric cell, an interferometric system including a reflecting surface on said crystal for energizing said photoelectric cell in accordance with the expansion and contraction of said crystal, and means intermediate said cell and said heat source for controlling said heat source in accordance with the energization of said cell.

4. In combination, a source of light, a reflecting surface, a medium intermediate said light and said reflecting surface upon which an interfering light pattern is formed, and means for maintaining said reflecting surface a constant distance from said intermediate medium, said last mentioned means comprising a photoelectric cell focussed on said light pattern and thermionic oscillators controlled by said cell.

5. In combination, a source of light, a reflecting surface fixedly connected to a magnetic element, magnetic means positioned near said element, oscillators for energizing said magnetic means, a medium intermediate said light source and said reflecting surface for forming a light pattern, and means controlled by said pattern for actuating said oscillators in accordance with the direction of movement of said reflecting surface.

6. In a temperature control system, means for varying temperature in accordance with the direction of current therethrough, means for supplying current to said temperature varying means, means for forming an interference light pattern, means for varying said interference light pattern with changes in temperature, and means for changing the direction of current in said supply in accordance with the variations in said interference pattern.

7. In a temperature control system, a crystal, means attached to said crystal together with a light source and partial light transmission medium to form a varying interference light pattern with changes in temperature of said crystal, a second means adjacent said crystal for heating and cooling said crystal in accordance with the direction of current therethrough, a current supply and means for controlling the direction of said current flow from said supply in accordance with the changes in said interference light pattern.

8. In a crystal oscillator control system, means attached to said crystal together with a light source and partial light transmission medium to form a varying interference light pattern with change in resonance frequency, heating means adjacent said crystal for controlling the frequency of oscillation thereof, and means controlled by said light pattern for supplying energy to said heating means.

9. In a crystal oscillator control system, a piezoelectric crystal, an oscillating circuit in which said crystal is connected, a light source, a reflecting surface on said crystal, means including said light source and reflecting surface for creating an interference light pattern, magnetic means for aiding and opposing the mechanical operation of said crystal, and means effected by the movement of said interference pattern for controlling said magnetic means.

10. In a crystal oscillator control system, an oscillating crystal subject to variations in dimensions, a reflecting surface on said crystal, a light source, means including said reflecting surface and light source for creating an interference pattern, a photoelectric cell focussed on said pattern and energized by movements of said pattern, magnetic means for varying the operation of said crystal, and means intermediate said photocell and said magnetic means for controlling the phase of the currents supplied to said magnetic means.

11. In a crystal oscillator control system, a piezoelectric crystal subject to changes in resonance, a light source, and means including a reflecting surface on said crystal and said light source for creating an interference light pattern, means operated by movement of said pattern, a current supply controlled by said last mentioned means, and a plurality of cooling and heating units dependent upon the direction of current therethrough adjacent said crystal connected to said current supply, said units being supplied with direct current having a polarity in accordance to the movement of said interference pattern.

12. In a crystal oscillator control system, a crystal subject to changes in resonance, an interference light system having a reflecting surface of said crystal included therein to form a light pattern, oscillators, means intermediate said oscillators and interferometric system for controlling said oscillators in accordance with the movement of said interference pattern, a plurality of thermo-couples adjacent said crystal for heating and cooling said crystal in accordance with the direction of current therethrough, and means for connecting said oscillators and thermo-couples, said oscillators supplying current thereto of a polarity dependent upon the direction of movement of said interference pattern.

13. In combination a source of light, a medium for partially transmitting said light, a photoelectric device, a reflecting surface mounted upon an element to be controlled, said surface reflecting said transmitted light to said medium, means for projecting the light from said medium to said photocell, and means energized from said photosensitive device to control said element having said reflecting surface mounted thereon, said means including an oscillating circuit.

14. In combination a source of light, a medium for partially transmitting said light, a photosensitive device, a reflecting surface mounted on a frequency control element in an electrical circuit, said element being subject to frequency variations with temperature changes, said surface reflecting said transmitted light to said medium, means for projecting the light on said medium to said photocell, and means energized by currents from said photosensitive device to adjust the frequency of said control element.

ALEXANDER McLEAN NICOLSON.